US010618739B2

(12) United States Patent
Wang (10) Patent No.: US 10,618,739 B2
(45) Date of Patent: Apr. 14, 2020

(54) DELIVERY SYSTEM AND LAYERED STACKING DEVICE FOR PAPER PACKAGES

(71) Applicant: CHAN LI MACHINERY CO., LTD., Taoyuan (TW)

(72) Inventor: Shin-Hao Wang, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 0 days.

(21) Appl. No.: 16/130,168

(22) Filed: Sep. 13, 2018

(65) Prior Publication Data

US 2019/0077604 A1 Mar. 14, 2019

(30) Foreign Application Priority Data

Sep. 14, 2017 (TW) .............................. 106131541 A (51) Int. Cl.
*B65G 15/58* (2006.01)
*B65G 57/06* (2006.01)
*B65G 57/11* (2006.01)
*B65H 5/04* (2006.01)
*B65H 31/30* (2006.01)
*B65H 5/00* (2006.01)
*B65B 35/50* (2006.01)

(52) U.S. Cl.
CPC .............. *B65G 15/58* (2013.01); *B65B 35/50* (2013.01); *B65G 57/06* (2013.01); *B65G 57/11* (2013.01); *B65H 5/006* (2013.01); *B65H 5/04* (2013.01); *B65H 31/3081* (2013.01); *B65H 2301/42266* (2013.01); *B65H 2701/1924* (2013.01)

(58) Field of Classification Search
CPC ........ B65G 15/58; B65G 57/06; B65G 57/11; B65H 5/04
USPC ............ 414/788.8, 788.9, 789, 789.3, 789.9, 414/790.3, 790.5, 792.7, 793.8; 198/37.07
See application file for complete search history.

(56) References Cited

U.S. PATENT DOCUMENTS

| | | | | |
|---|---|---|---|---|
| 5,011,123 A | * | 4/1991 | Vigano' ................. | B65H 29/62 270/52.04 |
| 5,353,576 A | * | 10/1994 | Palamides ............... | B65B 27/08 414/790.5 |
| 6,053,695 A | * | 4/2000 | Longoria ............... | A21C 9/086 414/788.9 |

(Continued)

*Primary Examiner* — Douglas A Hess
(74) *Attorney, Agent, or Firm* — Rosenberg, Klein & Lee (57) ABSTRACT

The invention provides a delivery system and layered stacking device for paper packages. The layered stacking device comprises a upper layer mechanism, a lower layer mechanism, and a pushing mechanism. The upper layer mechanism protrudes to an outlet of a delivery device to receive at least two paper packages. The paper packages will be stacked and neatly arranged on the upper layer mechanism. When the lower layer mechanism is raised to a first height and therefore close to the outlet, the upper layer mechanism will be withdrawn from the outlet of the delivery device, thereby the lower layer mechanism will receive the stacked paper packages that are dropped from the upper layer mechanism. Afterwards, when the lower layer mechanism is fallen to a second height, the pushing mechanism will push the stacked paper packages on the lower layer mechanism to a feeding device next the lower layer mechanism.

16 Claims, 7 Drawing Sheets

(56) References Cited

U.S. PATENT DOCUMENTS

| | | | | |
|---|---|---|---|---|
| 6,264,422 B1* | 7/2001 | Hennes | ............... | B65G 47/086 |
| | | | | 414/791.6 |
| 6,295,922 B1* | 10/2001 | Salamone | ............. | B65H 29/66 |
| | | | | 100/7 |
| 7,677,543 B2* | 3/2010 | Gulbrandsen | ............ | B65H 5/26 |
| | | | | 198/418.1 |
| 7,686,153 B2* | 3/2010 | Tsai | ...................... | B65G 57/10 |
| | | | | 198/347.1 |
| 7,784,253 B2* | 8/2010 | Blome | ................... | B65B 53/02 |
| | | | | 53/440 |
| 8,056,704 B2* | 11/2011 | Christ | .................. | B65B 35/405 |
| | | | | 198/617 |
| 8,657,555 B2* | 2/2014 | Kokubo | ................ | B65H 31/20 |
| | | | | 271/215 |
| 9,212,011 B2* | 12/2015 | Matsumoto | ............ | B65G 57/11 |
| 10,053,264 B2* | 8/2018 | Roos | ...................... | B65G 57/11 |

* cited by examiner

DELIVERY SYSTEM AND LAYERED STACKING DEVICE FOR PAPER PACKAGES

This non-provisional application claims priority claim under 35 U.S.C. § 119 (a) on Taiwan Patent Application No. 106131541 filed Sep. 14, 2017, the entire contents of which are incorporated herein by reference.

FIELD OF THE INVENTION

The present invention relates to a delivery system, more particularly, to a system for delivering paper packages.

BACKGROUND

In the production process of paper products, the paper is often packaged into a paper package by a small packaging machine, and then each of paper packages deliver to a feeding device in sequence via a delivery device. Afterwards, the feeding device pushes a plurality of paper packages to a collective packaging machine so that a plurality of paper packages can be packaged into a collective paper product by the collective packaging machine.

Besides, an air cylinder type of layered stacking device is disposed between the delivery device and the feeding device, and used to stack a plurality of paper packages in layers, so as to reduce the number of times of delivering the paper packages of the feeding device. The air cylinder type of layered stacking device comprises a plurality of boards, for example, upper layer board and lower layer board. During the delivery of the paper packages, firstly, the delivery device can push one paper package to upper layer board of the layered stacking device, then, the air cylinder type of layered stacking device may control the upper layer board in a means of air pressure to perform a withdrawn action, and thus the paper package originally placed on the upper layer board will drop onto the lower layer board. Afterwards, the delivery device continues to push another paper packages to the lower layer board, thereby the at least two paper packages can be stacked on the lower layer board of the air cylinder type of layered stacking device. Finally, the air cylinder type of layered stacking device may control the lower layer board in the means of air pressure to perform a withdrawn action, and therefore the stacked paper packages can be dropped onto the feeding device. Accordingly, the feeding device can push the stacked paper packages received from the air cylinder type of layered stacking device to the collective packaging machine to perform a collective packaging process for the stacked paper packages.

However, the paper packages are stacked by the using of the air cylinder type of layered stacking device, it will easy to cause that the arrangement of the stacked paper packages are not neat because of the time of operation of the air cylinder type is not accurate or the paper packages would be received in a way of free fall, in such a way that the non-neatly arranged paper packages are easily dumped before they are pushed into the collective packaging machine, or easily to occur errors in packaging process of the collective packaging machine. Furthermore, after the delivery device stacks the paper packages to the air cylinder type of layered stacking device, the delivery device needs to stop operating, so as to wait for the stacked paper packages to be completely delivered to the feeding device by the air cylinder type of layered stacking device, and the air cylinder type of layered stacking device to return to a predetermined position where receives the stacked paper packages. When the stacked paper packages on the air cylinder type of layered stacking device has delivered to the feeding device and the air cylinder type of layered stacking device has returned to the predetermined position where receives the stacked paper packages, the air cylinder type of layered stacking device can begin to be operated, again. Such the above production process will not only reduce the production of paper products, but also the going and stopping of the delivery device in a short time will easily cause the burden on the operation of the delivery device.

SUMMARY

It is one objective of the present invention to provide a delivery system and layered stacking device for paper packages, in which the delivery system comprises a delivery device, the layered stacking device, and a feeding device. The layered stacking device receives at least two paper packages from the delivery device. The paper packages will be stacked and neatly arranged on the layered stacking device. The layered stacking device can deliver the stacked and neatly arranged paper packages to the feeding device.

It is another objective of the present invention to provide a delivery system and layered stacking device for paper packages, in which the layered stacking device comprises a upper layer mechanism, a lower layer mechanism, and a pushing mechanism. When the upper layer mechanism protrudes to an outlet of the delivery device, it will receive at least two paper packages from the outlet of the delivery device in sequence. The at least two paper packages will be stacked and neatly arranged on the upper layer mechanism. When the upper layer mechanism is withdrawn from the outlet of the delivery device, the lower layer mechanism at a first height will receive the stacked and neatly arranged paper packages that are dropped from the upper layer mechanism. Afterwards, when the lower layer mechanism is fallen to a second height from the first height, the pushing mechanism will push the stacked and neatly arranged paper packages on the lower layer mechanism to a feeding device.

It is another objective of the present invention to provide a delivery system and layered stacking device for paper packages, wherein the delivery device can continue to deliver the paper packages to the upper layer mechanism of the layered stacking device during the layered stacking device delivers the stacked and neatly arranged paper packages to the feeding device, in such a production way that can not only increase the production of paper products, but also the switching of the going and stopping of the delivery device in a short time can be avoided to reduce the burden on the motor of the delivery device.

It is another objective of the present invention to provide a delivery system and layered stacking device for paper packages, wherein a servo motor of the layered stacking device can control a falling speed of the lower layer mechanism in a way of acceleration and deceleration, such that the stacked paper packages do not generate to sway during the falling process of the lower layer mechanism.

To achieve the above objective, the present invention provides a layered stacking device for paper packages, which is a servo layered stacking device, the layered stacking device comprising: an upper layer mechanism being a mechanism capable for allowing to move left and right, when the upper layer mechanism protrudes to an outlet of a delivery device, the upper layer mechanism will receive at least two paper packages from an outlet of a delivery device in sequence, the paper packages will be stacked on the upper layer mechanism; a lower layer mechanism being a mechanism capable for allowing to move up and down, and located directly below the outlet of the delivery device, when the lower layer mechanism is raised to a first height to approach to the upper layer mechanism, the upper layer mechanism will be withdrawn from the outlet of the delivery device, thereby the lower layer mechanism will receive the stacked paper packages that are dropped from the upper layer mechanism; and a pushing mechanism being a mechanism capable for allowing to move left and right, wherein the pushing mechanism can be moved on both sides of the lower layer mechanism, when the lower layer mechanism is fallen to a second height from the first height, the pushing mechanism located at one side of the lower layer mechanism will push the stacked paper packages on the lower layer mechanism to a feeding device located at other side of the lower layer mechanism.

In one embodiment of the present invention, wherein the delivery device comprises a bearing platform for bearing the paper packages, the outlet is located at one side of the bearing platform, the paper packages on the bearing platform will be pushed to the outlet.

In one embodiment of the present invention, wherein the delivery device comprises a conveyor belt, at least two turning wheels, and a plurality of pushing boards, the conveyor belt wraps around the turning wheels, the pushing boards are configured on the conveyor belt, when the conveyor belt is rotated by the driving of the turning wheels, the pushing boards on the conveyor belt will be moved to push the paper packages on the bearing platform to the outlet.

In one embodiment of the present invention, wherein the outlet is a space surrounded by a first side board and a second side board.

In one embodiment of the present invention, wherein the layered stacking device further comprises a baffle board that is a board capable for allowing to move up and down, and located at other side of the lower layer mechanism; when the lower layer mechanism is risen to the first height, the pushing mechanism will be located at the one side of the lower layer mechanism and close to the first side board of the outlet, the baffle board will be risen and close to the second side board of the outlet, thereby a delivery channel is formed between the baffle board and the pushing mechanism, and connected to the outlet, the stacked paper packages on the lower layer mechanism can be delivered via the delivery channel.

In one embodiment of the present invention, when the lower layer mechanism is fallen to the second height from the first height, the baffle board will be also fallen to a predetermined height, which is equal to or lower than the second height.

In one embodiment of the present invention, wherein the layered stacking device further comprises a servo motor, the servo motor is connected to the upper layer mechanism, the lower layer mechanism, and the pushing mechanism, and used to control the movements of the upper layer mechanism, the lower layer mechanism, and the pushing mechanism; when the lower mechanism just begins to be fallen from the first height, the servo motor will control a fallen speed of the lower layer mechanism in a means of slow acceleration; afterwards, when the lower mechanism continues to fall and therefore approaches the second height, the servo motor will control the fallen speed of the lower layer mechanism in a means of slow deceleration.

In one embodiment of the present invention, when the lower layer mechanism has fallen to the second height, the upper layer mechanism will protrude to the outlet of the delivery device, again, to continue receive the paper packages pushed by the delivery device.

In one embodiment of the present invention, wherein the paper packages are paper handkerchiefs packages, facial tissue packages, or wet wipes packages.

The present invention further provides a delivery system for paper packages, comprising: a delivery device, comprising an outlet, and used to deliver at least one paper packages; a layered stacking device located below the delivery device, the layered stacking device comprising: an upper layer mechanism being a mechanism capable for allowing to move left and right, when the upper layer mechanism protrudes to the outlet of the delivery device, the upper layer mechanism will receive the at least two paper packages from the outlet of the delivery device in sequence, the paper packages will be stacked on the upper layer mechanism; a lower layer mechanism being a mechanism capable for allowing to move up and down, and located directly below the outlet of the delivery device, when the lower layer mechanism is raised to a first height to approach to the upper layer mechanism, the upper layer mechanism will be withdrawn from the outlet of the delivery device, thereby the lower layer mechanism will receive the stacked paper packages that are dropped from the upper layer mechanism; and a pushing mechanism being a mechanism capable for allowing to move left and right, wherein the pushing mechanism can be moved on both sides of the lower layer mechanism; and a feeding device located, when the lower layer mechanism is fallen to a second height from the first height, the pushing mechanism located at one side of the lower layer mechanism will push the stacked paper packages on the lower layer mechanism to the feeding device located at other side of the lower layer mechanism.

DETAILED DESCRIPTION OF THE PREFERRED EMBODIMENTS

Referring to FIGS. 1A to 1G, there are shown schematic diagrams of each of operations of a layered stacking device for paper packages of the present invention. As shown in FIGS. 1A to 1G, the delivery system 100 is used for delivering a paper packages 10, and comprises a delivery device 20, a layered stacking device 30, and a feeding device 40.

The delivery device 20 comprises a conveyor belt 21, at least one two turning wheels 22, a plurality of pushing boards 23, and a bearing platform 24. The conveyor belt 21 will wrap around the turning wheels 22, the pushing boards 23 will be configured on the conveyor belt 21. When the conveyor belt 21 is rotated by the driving of the turning wheels 22, the pushing boards 23 on the conveyor belt 21 will be moved to push the paper packages 10 on the bearing platform 24. Besides, the delivery device 20 comprises an outlet 25, which is located at one side of the bearing platform 24. The outlet 25 is a space surrounded by a first side board 251 and a second side board 252. When the delivery device 20 is operating, the paper packages 10 on the bearing platform 24 will be push to the outlet 25 by the pushing boards 23.

The layered stacking device 30 is located below the delivery device 20, and it is a servo layered stacking device.

The layered stacking device 30 is used for receiving at least two paper packages 10 delivered by the delivery device 20, stacking and arranging the paper packages 10, and pushing the paper packages 10 to the feeding device 40. The layered stacking device 30 comprises an upper layer mechanism 31, a lower layer mechanism 32, and a pushing mechanism 33. The upper layer mechanism 31 is a mechanism capable of allowing to move left and right, and it can be moved right and left under the bearing platform 24 and the outlet 25. The lower layer mechanism 32 is a mechanism capable of allowing to move up and down, it is located directly below the outlet 25 of the delivery device 20, and can be moved up and down below the outlet 25. The pushing mechanism 33 is a mechanism capable of allowing to move left and right, and it can be moved left and right on both sides of the lower mechanism 32. Furthermore, the layered stacking device 30 further comprises a baffle board 34. The baffle board 34 is a mechanism capable of allowing to move up and down. The baffle board 34 and the feeding device 40 are both located at other side of the lower layer mechanism 32.

Figure 1A:
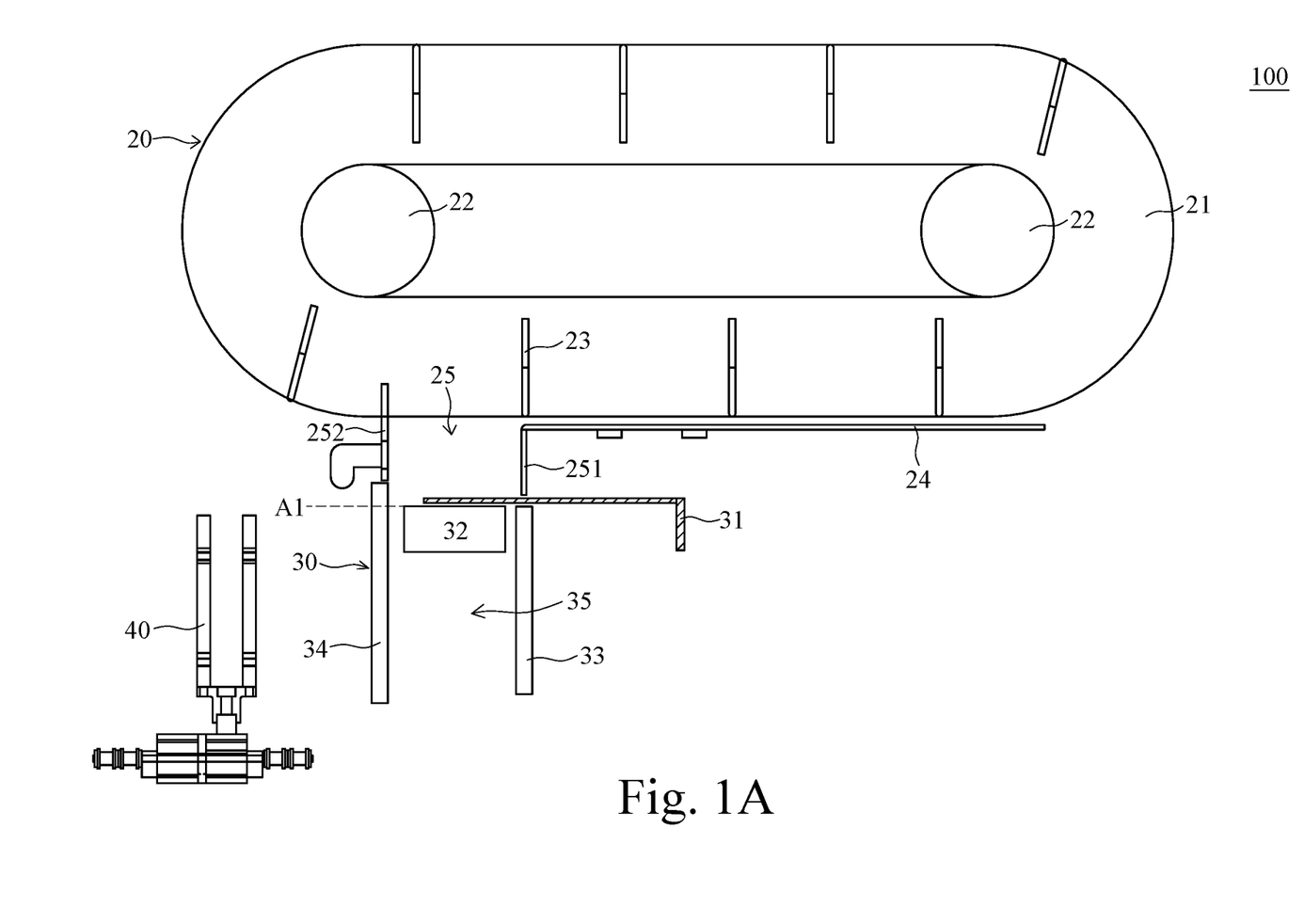
FIGS. 1A to 1G are shown schematic diagrams of each of operations of a layered stacking device of a delivery system for paper packages of the present invention.

The delivering process of the delivery system 100 of the present invention is described as the following: as shown in FIG. 1A, firstly, the upper layer mechanism 31 protrudes to the below of the outlet 25 before the delivery system 100 delivers the paper packages 10, the lower layer mechanism 32 can be raised to a first height A1 and approaches to the upper layer mechanism 31. The pushing mechanism 33 will be located on one side, for example, right side, and approach to the first side board 251 of the outlet 25. Then, the baffle board 34 is raised to approach to the second side board 252 of the outlet 25, thereby a delivery channel 35 is formed between the baffle board 34 and the pushing mechanism 33, and connected to the outlet 25.

Figure 1B:
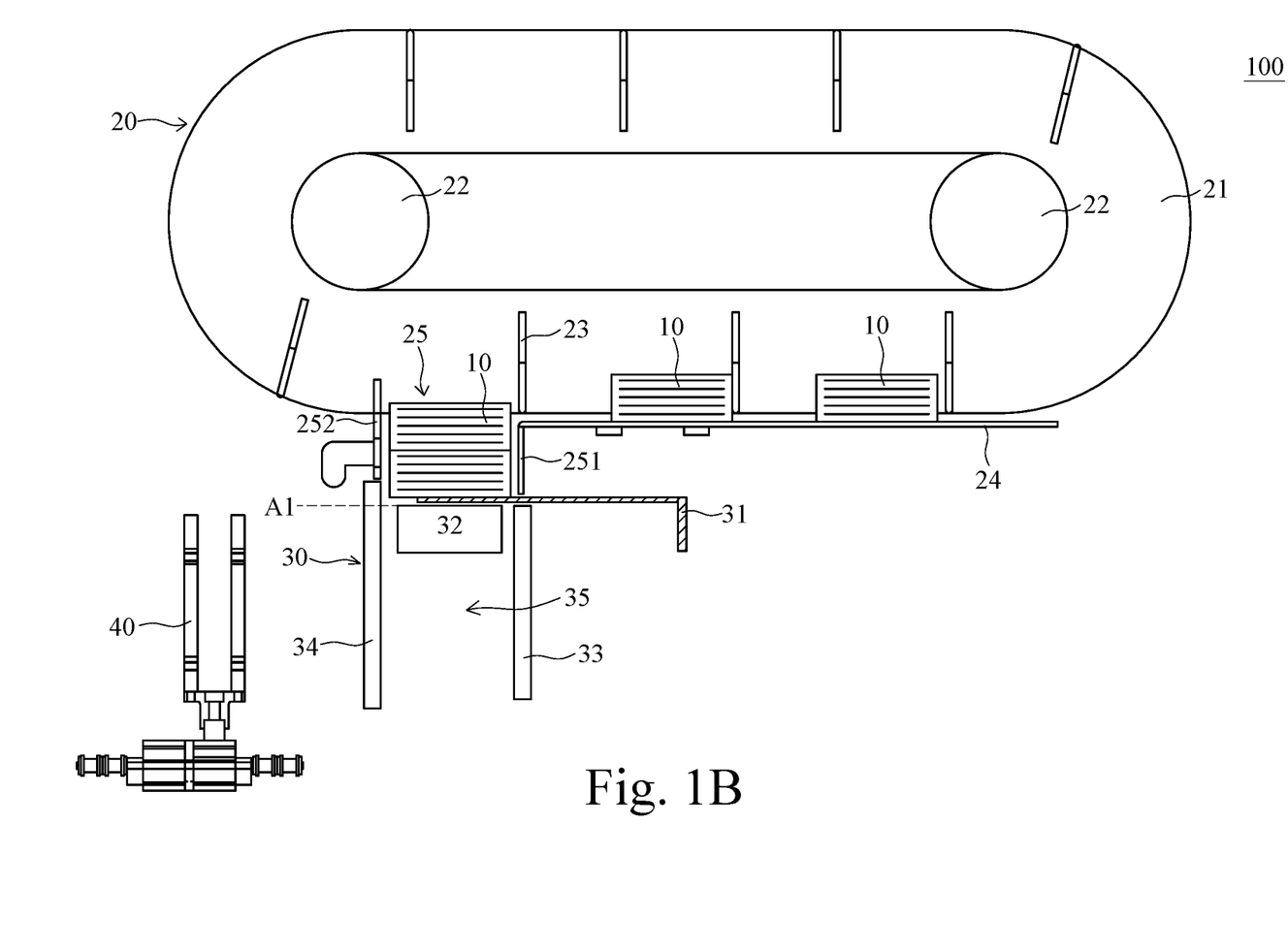

As shown in FIG. 1B, the delivery system 100 is beginning to deliver the paper packages 10 placed on the bearing platform 24 of the delivery device 20. The pushing board 23 can be moved by the rotation of the conveyor belt 21. The pushing board 23 pushes the paper packages 10 on the bearing platform 24 to the outlet 25. The upper layer mechanism 31 receives at least two paper packages 10 from the outlet 25 in sequence. These paper packages 10 will be stacked on the upper layer mechanism 31.

Figure 1C:
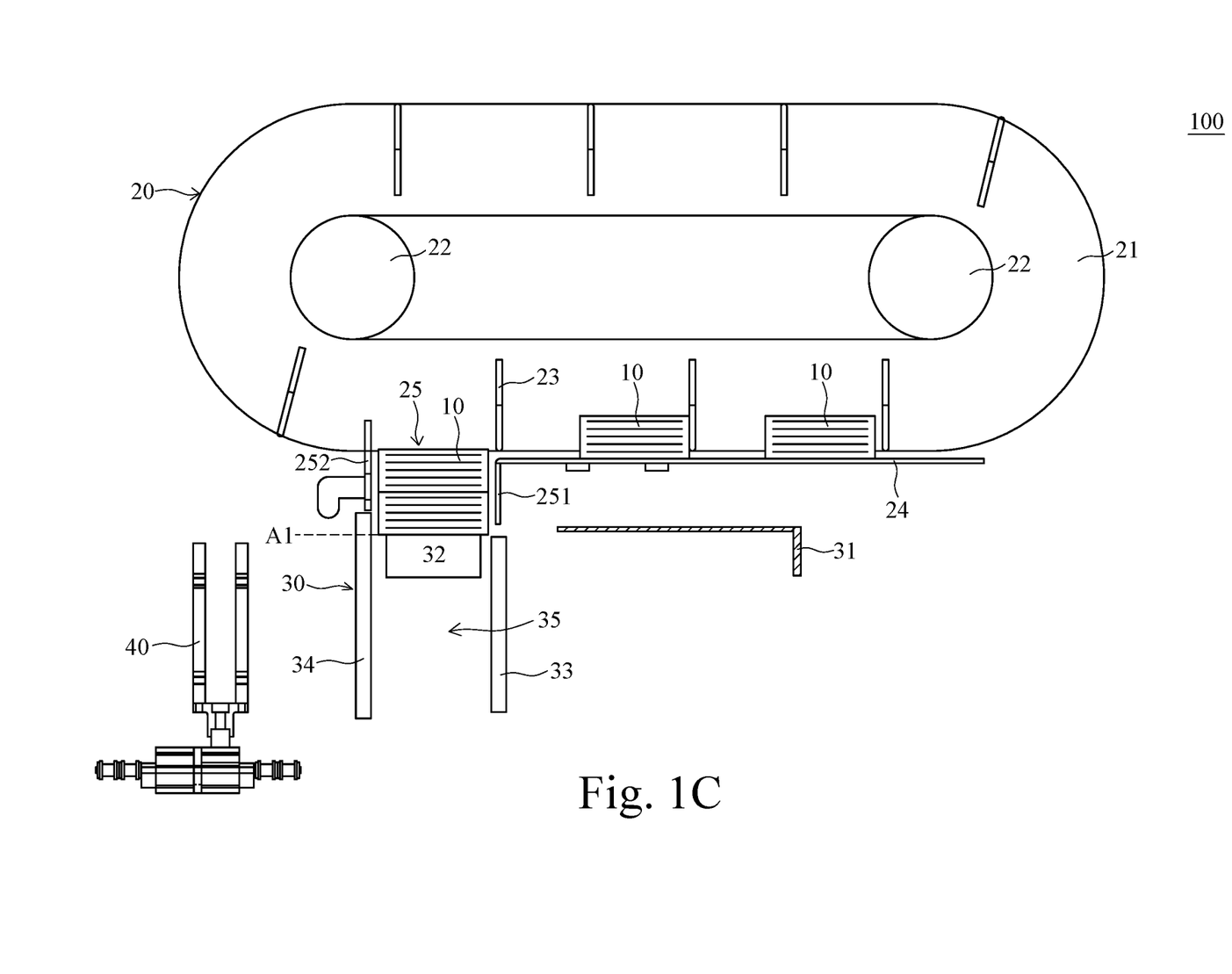

As shown in FIG. 1C, the upper layer mechanism 31 is withdrawn from the below of the outlet 25 of the delivery device 20, and then the lower layer mechanism 32 at the first height A1 receives the stacked paper packages 10 that are dropped from the upper layer mechanism 31. In the present invention, the lower layer mechanism 32 approaches to the upper layer mechanism 31 to receive the stacked paper packages 10, these stacked paper packages 10 do not generate a lager jump when they are dropped onto the lower layer mechanism 32, thereby these stacked paper packages 10 can be neatly arranged on the lower layer mechanism 32.

Figure 1D:
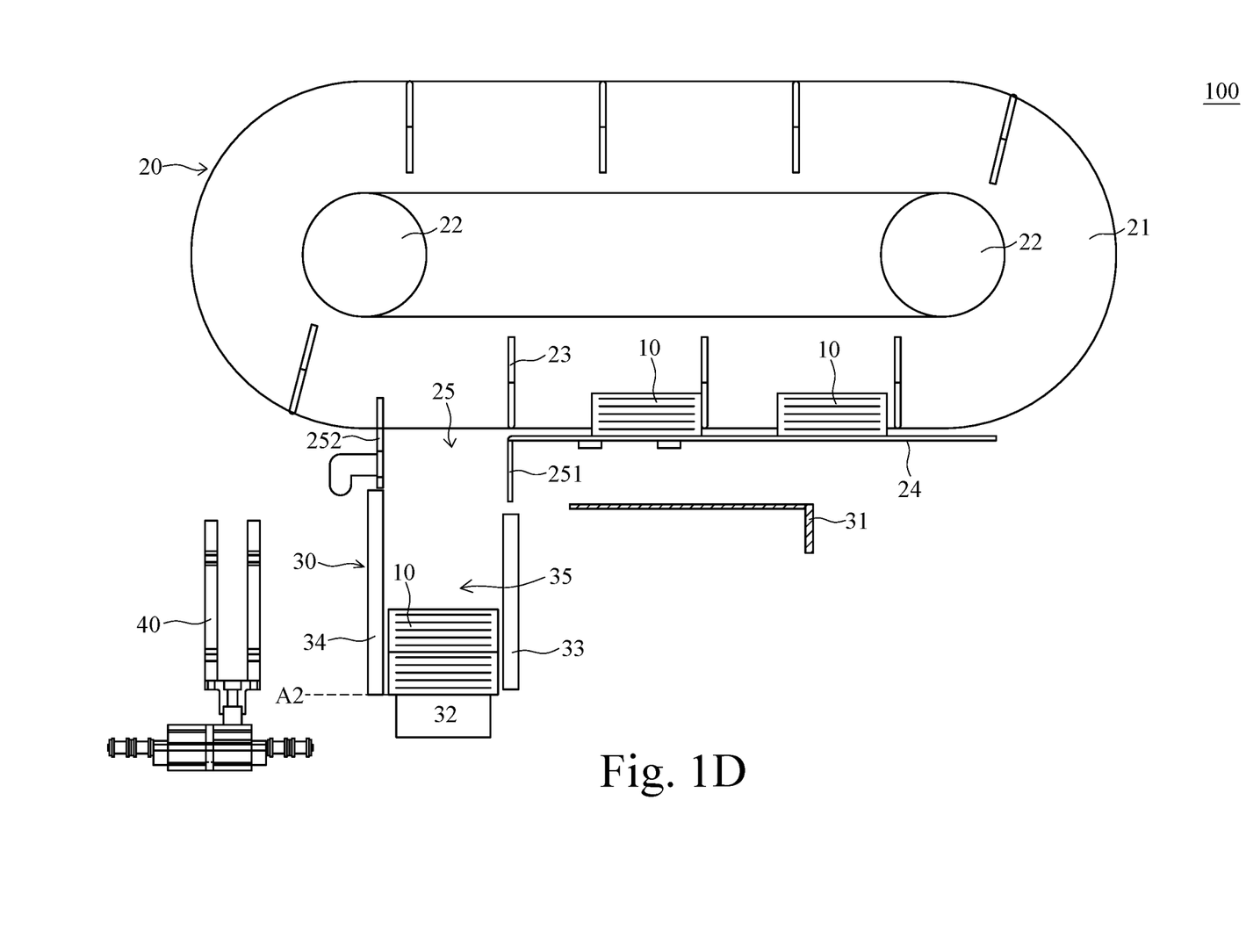

As shown in FIG. 1D, the lower layer mechanism 32 delivers the stacked paper packages 10 from the first height A1 to the second height A2 via the delivery channel 35 after the lower layer mechanism 32 receives the stacked paper packages 10. The first height A1 is higher than the second height A2. Accordingly, these paper packages 10, via the delivering of the delivery channel 35, may be neatly arranged on the lower layer mechanism 32, and do not fall out from the lower layer mechanism 32 during the delivering process. In one embodiment of the present invention, the layered stacking device 30 further comprises a servo motor (not shown). The servo motor is connected to the upper layer mechanism 31, the lower layer mechanism 32, the pushing mechanism 33, and the baffle board 34, and used to control the movements of the upper layer mechanism 31, the lower layer mechanism 32, the pushing mechanism 33, and the baffle board 34. When the lower mechanism 32 just begins to be fallen from the first height A1, the servo motor will control a fallen speed of the lower layer mechanism 32 in a means of slow acceleration. Afterwards, when the lower mechanism 32 continues to fall and approaches to the second height A2, the servo motor will control the fallen speed of the lower layer mechanism 32 in a means of slow deceleration. Such that the stacked paper packages do not generate to sway during the falling of the lower layer mechanism 32 by the servo motor controlling the falling speed of the lower layer mechanism 32 in a way of acceleration and deceleration.

Figure 1E:
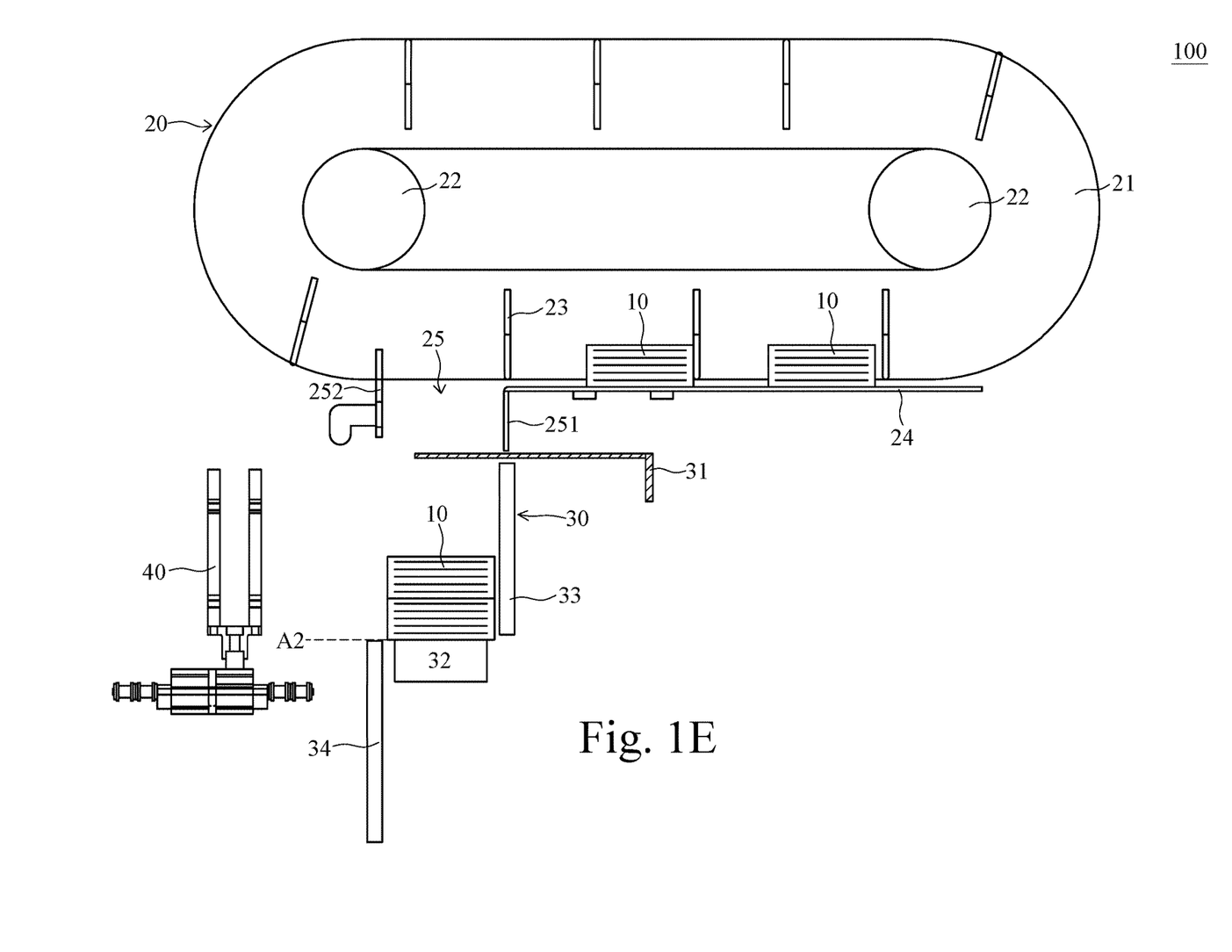
Figure 1F:
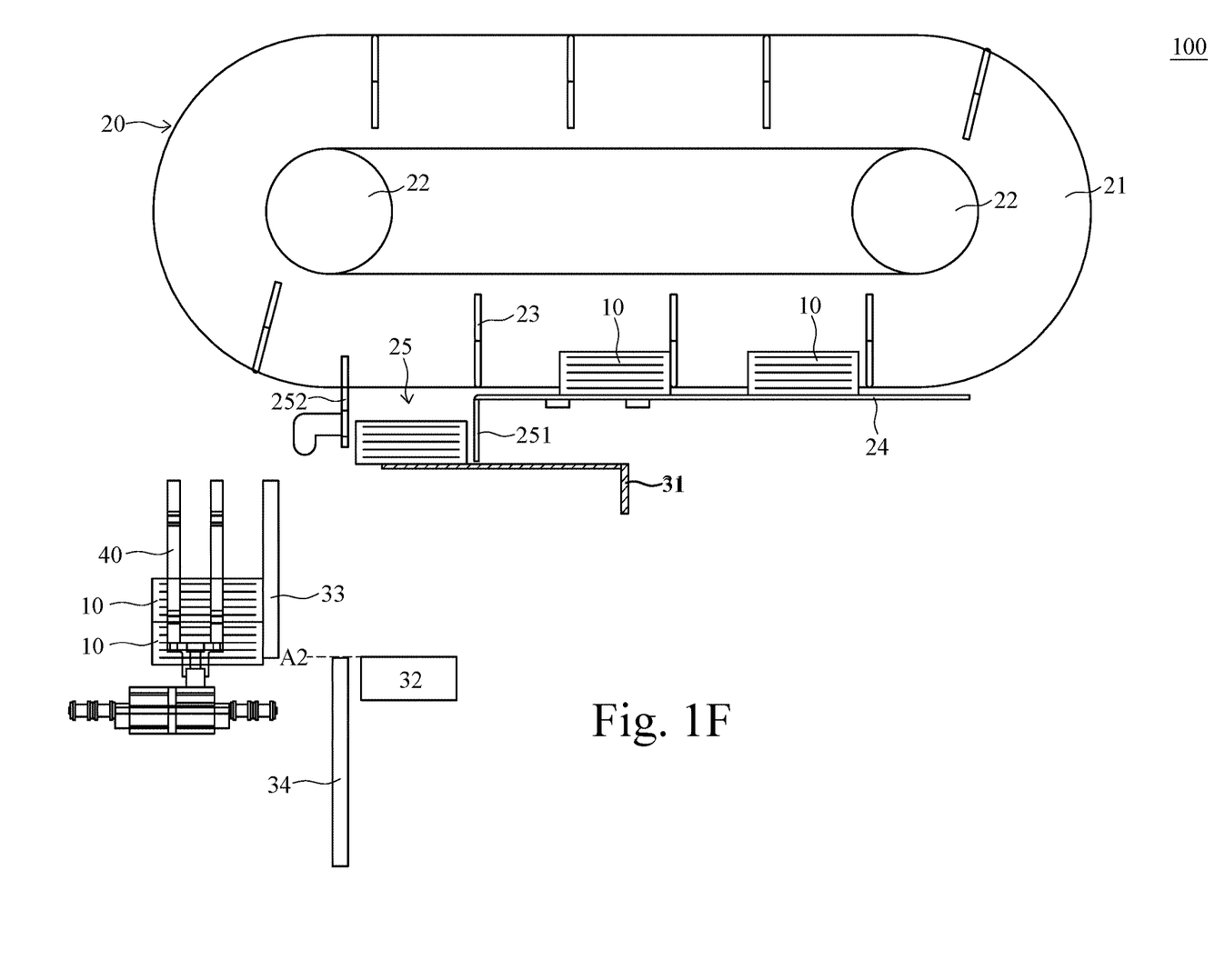

As shown in FIG. 1E, when the lower layer mechanism 32 has fallen to the second height A2 from the first height A1, the upper end of the baffle board 34 will be also fallen to a predetermined height. The predetermined height is equal to or lower than the second height A2. As shown in FIG. 1F, then, the pushing mechanism 33 located at one side of the lower layer mechanism 32 will push the stacked paper packages 10 on the lower layer mechanism 32 to the feeding device 40 located at other side of the lower layer mechanism 32. After the feeding device 40 receives the stacked paper packages 10 from the layered stacking device 30, the stacked paper packages 10 will continue to be pushed by the feeding device 40 to a collective packaging machine (not shown), so that the collective packaging machine can perform a collective packaging process for the stacked paper packages 10 to form a paper product.

Figure 1G:
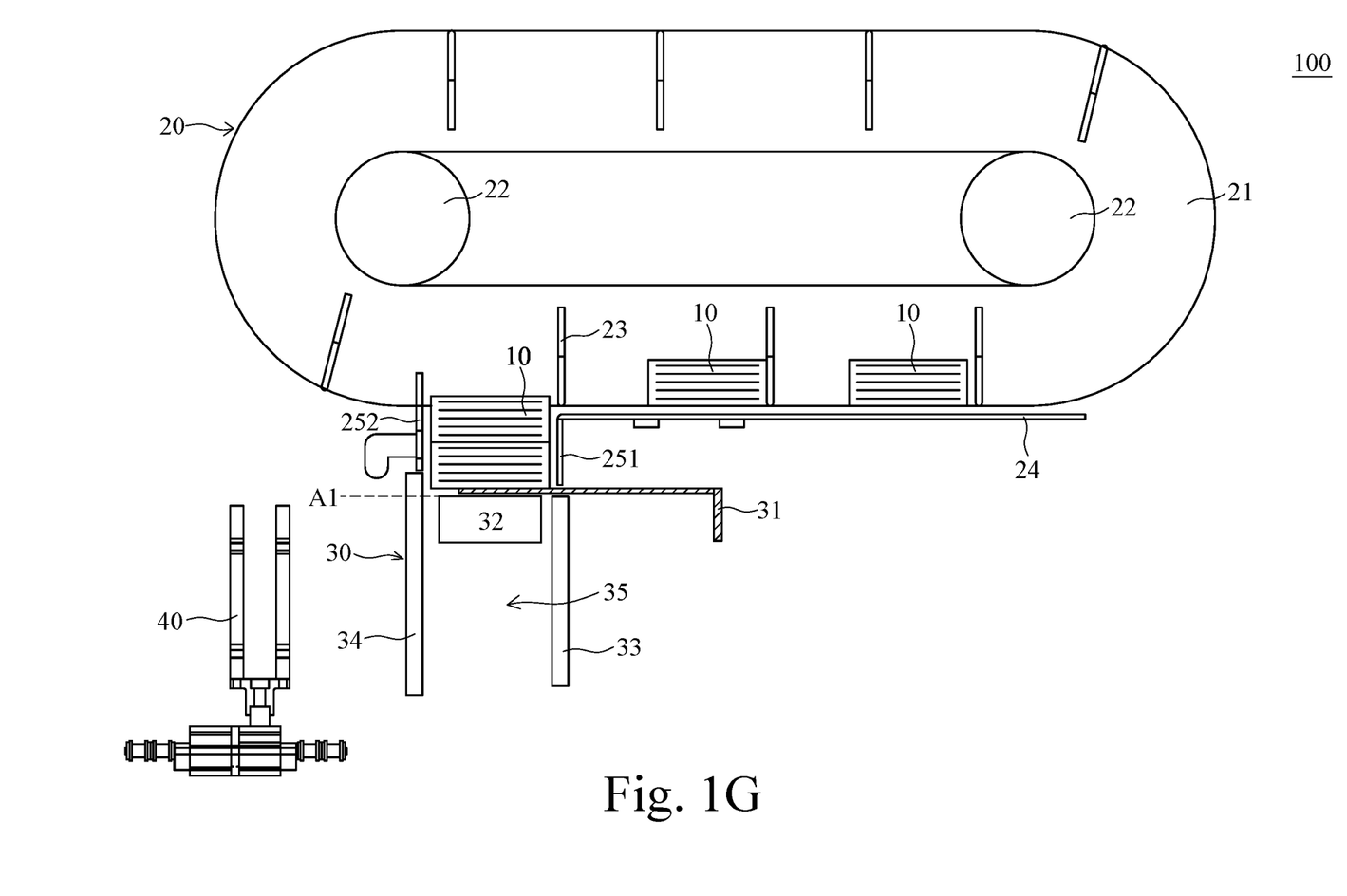

As shown in FIG. 1G, after the layered stacking device 30 delivers the stacked paper packages 10 to the feeding mechanism 40, the pushing mechanism 33 is moved back to one side of the lower layer mechanism 32, the lower mechanism 32 is again raised to the first height A1, and the baffle board 34 is raised again to be adjacent to the second side board 252 of the outlet 25, such that the next stacked paper package 10 can be continued to deliver.

Accordingly, the delivery system 100 of the present invention can deliver the paper packages 10 in a way of stacking by the disposition of the layered stacking device 30. Besides, the paper packages 10 will maintain to be arranged neatly during the delivering process via the outlet 25 and the layered stacking device 30, so that the neatly arranged paper packages 10 can be smoothly delivered to the collective packaging machine to perform the collective packaging.

Referring to FIGS. 1E and 1F, again, when the lower layer mechanism 32 has fallen to the second height A2, the upper layer mechanism 31 will protrude to the below of the outlet 25, again, to continue receive the paper packages 10 delivered by the delivery device 20. Thus, the delivery device 20 can continue to deliver the paper packages 10 to the upper layer mechanism 31 of the layered stacking device 30 during the lower layer mechanism 32 of the layered stacking device 30 delivering the stacked and neatly arranged paper packages 10 to the feeding device 40, in such a production way that can not only increase the production of paper products, but also the switching of the going and stopping of the delivery device 20 in a short time can be avoided to reduce the burden on the motor of the delivery device 20.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

What is claimed is:

1. A layered stacking device for paper packages, the layered stacking device being servo-driven, and the layered stacking device comprising:
    an upper layer mechanism configured to move left and right, when the upper layer mechanism protrudes to an outlet of a delivery device, the upper layer mechanism sequentially receives at least two paper packages from the outlet, the paper packages being stacked on the upper layer mechanism, wherein the delivery device includes a bearing platform and the paper packages bear against the bearing platform, the outlet being located at a side of the bearing platform, and the paper packages on the bearing platform being pushed to the outlet;
    a lower layer mechanism configured to move up and down, and located directly below the outlet of the delivery device, when the lower layer mechanism is raised to a first height to approach the upper layer mechanism, the upper layer mechanism is withdrawn from the outlet of the delivery device, the lower layer mechanism thereby receives the stacked paper packages dropped from the upper layer mechanism; and
    a pushing mechanism configured to move left and right, wherein the pushing mechanism is movable across opposing first and second sides of the lower layer mechanism, when the lower layer mechanism falls to a second height from the first height, the pushing mechanism located at the first side of the lower layer mechanism pushes the stacked paper packages on the lower layer mechanism to a feeding device located adjacent the second side of the lower layer mechanism.

2. The layered stacking device according to claim 1, wherein the delivery device includes a conveyor belt, at least two turning wheels, and a plurality of pushing boards, the conveyor belt wraps around the turning wheels, the pushing boards are configured on the conveyor belt, when the conveyor belt is rotated by driving of the turning wheels, the pushing boards on the conveyor belt move to push the paper packages on the bearing platform to the outlet.

3. The layered stacking device according to claim 1, wherein the outlet is a space surrounded by a first side board and a second side board.

4. The layered stacking device according to claim 3, the layered stacking device further comprising a baffle board configured to move up and down, and located at the second side of the lower layer mechanism; when the lower layer mechanism rises to the first height, the pushing mechanism is located at the first side of the lower layer mechanism and adjacent to the first side board of the outlet, the baffle board rises to be adjacent to the second side board of the outlet, a delivery channel is thereby formed between the baffle board and the pushing mechanism, and connected to the outlet, the stacked paper packages on the lower layer mechanism are deliverable via the delivery channel.

5. The layered stacking device according to claim 4, when the lower layer mechanism falls to the second height from the first height, the baffle board falls to a predetermined height, the predetermined height being equal to or lower than the second height.

6. The layered stacking device according to claim 1, the layered stacking device further comprising a servo motor, the servo motor is connected to the upper layer mechanism, the lower layer mechanism, and the pushing mechanism, to control the movements of the upper layer mechanism, the lower layer mechanism, and the pushing mechanism; when the lower layer mechanism initially falls from the first height, the servo motor controls a falling speed of the lower layer mechanism to provide for slow acceleration; subsequently, when the lower layer mechanism has continued to fall to thereby approach the second height, the servo motor controls the falling speed of the lower layer mechanism to provide for slow deceleration.

7. The layered stacking device according to claim 1, when the lower layer mechanism has fallen to the second height, the upper layer mechanism protrudes to the outlet of the delivery device to continue to receive the paper packages pushed by the delivery device.

8. The layered stacking device according to claim 1, wherein the paper packages are paper handkerchiefs packages, facial tissue packages, or wet wipes packages.

9. A delivery system for paper packages, comprising:
    a delivery device, including an outlet, and for delivering at least two paper packages, the outlet being a space surrounded by a first side board and a second side board;
    a layered stacking device located below the delivery device, the layered stacking device including:
        an upper layer mechanism configured to move left and right, when the upper layer mechanism protrudes to the outlet of the delivery device, the upper layer mechanism sequentially receives the at least two paper packages from the outlet of the delivery device, the paper packages being stacked on the upper layer mechanism;
        a lower layer mechanism configured to move up and down, and located directly below the outlet of the delivery device, when the lower layer mechanism is raised to a first height to approach the upper layer mechanism, the upper layer mechanism is withdrawn from the outlet of the delivery device, the lower layer mechanism thereby receives the stacked paper packages dropped from the upper layer mechanism;
        a pushing mechanism configured to move left and right, wherein the pushing mechanism is movable across opposing first and second sides of the lower layer mechanism; and
        a baffle board configured to move up and down, and located at the second side of the lower layer mechanism; when the lower layer mechanism rises to the first height, the pushing mechanism is located at the first side of the lower layer mechanism and adjacent to the first side board of the outlet, the baffle board rises to be adjacent to the second side board of the outlet, a delivery channel is thereby formed between the baffle board and the pushing mechanism, and connected to the outlet, the stacked paper packages on the lower layer mechanism are deliverable via the delivery channel; and
    a feeding device located adjacent the second side of the lower layer mechanism, when the lower layer mechanism falls to a second height from the first height, the pushing mechanism located at the first side of the lower layer mechanism pushes the stacked paper packages on the lower layer mechanism to the feeding device located adjacent the second side of the lower layer mechanism.

10. The delivery system according to claim 9, when the lower layer mechanism falls to the second height from the first height, the baffle board falls to a predetermined height, the predetermined height being equal to or lower than the second height.

11. The delivery system according to claim 9, wherein the layered stacking device further includes a servo motor, the servo motor is connected to the upper layer mechanism, the lower layer mechanism, and the pushing mechanism to control the movements of the upper layer mechanism, the lower layer mechanism, and the pushing mechanism; when the lower layer mechanism initially falls from the first height, the servo motor controls a falling speed of the lower layer mechanism to provide for slow acceleration; subsequently, when the lower layer mechanism has continued to fall to thereby approach the second height, the servo motor controls the falling speed of the lower layer mechanism to provide for slow deceleration.

12. The delivery system according to claim 9, when the lower layer mechanism has fallen to the second height, the upper layer mechanism protrudes to the outlet of the delivery device to continue to receive the paper packages pushed by the delivery device.

13. A layered stacking device for paper packages, the layered stacking device being servo-driven, and the layered stacking device comprising:
an upper layer mechanism configured to move left and right, when the upper layer mechanism protrudes to an outlet of a delivery device, the upper layer mechanism sequentially receives at least two paper packages from the outlet, the paper packages being stacked on the upper layer mechanism, wherein the outlet of the delivery device is a space surrounded by a first side board and a second side board;
a lower layer mechanism configured to move up and down, and located directly below the outlet of the delivery device, when the lower layer mechanism is raised to a first height to approach the upper layer mechanism, the upper layer mechanism is withdrawn from the outlet of the delivery device, the lower layer mechanism thereby receives the stacked paper packages dropped from the upper layer mechanism;
a pushing mechanism configured to move left and right, wherein the pushing mechanism is movable across opposing first and second sides of the lower layer mechanism, when the lower layer mechanism falls to a second height from the first height, the pushing mechanism located at the first side of the lower layer mechanism pushes the stacked paper packages on the lower layer mechanism to a feeding device located adjacent the second side of the lower layer mechanism; and
a baffle board configured to move up and down, and located at the second side of the lower layer mechanism; when the lower layer mechanism rises to the first height, the pushing mechanism is located at the first side of the lower layer mechanism and adjacent to the first side board of the outlet, the baffle board rises to be adjacent to the second side board of the outlet, a delivery channel is thereby formed between the baffle board and the pushing mechanism, and connected to the outlet, the stacked paper packages on the lower layer mechanism are deliverable via the delivery channel.

14. The layered stacking device according to claim 13, when the lower layer mechanism falls to the second height from the first height, the baffle board falls to a predetermined height, the predetermined height being equal to or lower than the second height.

15. A layered stacking device for paper packages, the layered stacking device being servo-driven, and the layered stacking device comprising:
an upper layer mechanism configured to move left and right, when the upper layer mechanism protrudes to an outlet of a delivery device, the upper layer mechanism sequentially receives at least two paper packages from the outlet, the paper packages being stacked on the upper layer mechanism;
a lower layer mechanism configured to move up and down, and located directly below the outlet of the delivery device, when the lower layer mechanism is raised to a first height to approach the upper layer mechanism, the upper layer mechanism is withdrawn from the outlet of the delivery device, the lower layer mechanism thereby receives the stacked paper packages dropped from the upper layer mechanism;
a pushing mechanism configured to move left and right, wherein the pushing mechanism is movable across opposing first and second sides of the lower layer mechanism, when the lower layer mechanism falls to a second height from the first height, the pushing mechanism located at the first side of the lower layer mechanism pushes the stacked paper packages on the lower layer mechanism to a feeding device located adjacent the second side of the lower layer mechanism; and
a servo motor, the servo motor is connected to the upper layer mechanism, the lower layer mechanism, and the pushing mechanism to control the movements of the upper layer mechanism, the lower layer mechanism, and the pushing mechanism; when the lower layer mechanism initially falls from the first height, the servo motor controls a falling speed of the lower layer mechanism to provide for slow acceleration; subsequently, when the lower layer mechanism has continued to fall to thereby approach the second height, the servo motor controls the falling speed of the lower layer mechanism to provide for slow deceleration.

16. A delivery system for paper packages, comprising:
a delivery device, including an outlet, and for delivering at least two paper packages;
a layered stacking device located below the delivery device, the layered stacking device including:
an upper layer mechanism configured to move left and right, when the upper layer mechanism protrudes to the outlet of the delivery device, the upper layer mechanism sequentially receives the at least two paper packages from the outlet of the delivery device, the paper packages being stacked on the upper layer mechanism;
a lower layer mechanism configured to move up and down, and located directly below the outlet of the delivery device, when the lower layer mechanism is raised to a first height to approach the upper layer mechanism, the upper layer mechanism is withdrawn from the outlet of the delivery device, the lower layer mechanism thereby receives the stacked paper packages dropped from the upper layer mechanism;
a pushing mechanism configured to move left and right, wherein the pushing mechanism is movable across opposing first and second sides of the lower layer mechanism; and
a servo motor, the servo motor is connected to the upper layer mechanism, the lower layer mechanism, and the pushing mechanism to control the movements of the upper layer mechanism, the lower layer mechanism, and the pushing mechanism; when the lower layer mechanism initially falls from the first height, the servo motor controls a falling speed of the lower layer mechanism to provide for slow acceleration; subsequently, when the lower layer mechanism has continued to fall to thereby approach a second height, the servo motor controls the falling speed of the lower layer mechanism to provide for slow deceleration; and a feeding device located adjacent the second side of the lower layer mechanism, when the lower layer mechanism falls to the second height from the first height, the pushing mechanism located at the first side of the lower layer mechanism pushes the stacked paper packages on the lower layer mechanism to the feeding device located adjacent the second side of the lower layer mechanism.

\* \* \* \* \*